May 29, 1928.
F. LANGE
1,671,730
METHOD OF ALUMINO THERMIC PRESSURE WELDING
Filed May 28, 1927
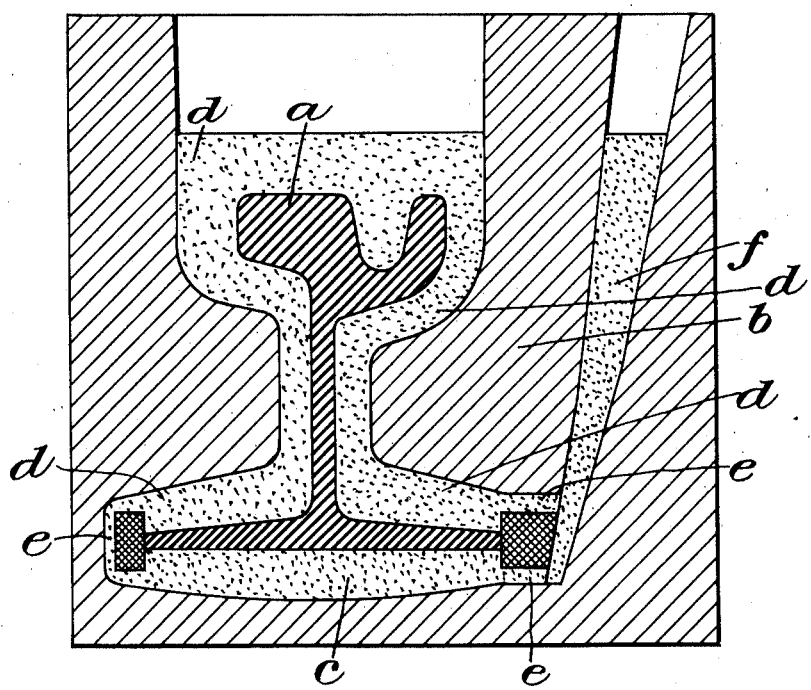
INVENTOR
Felix Lange
BY
HIS ATTORNEY Patented May 29, 1928.

1,671,730

UNITED STATES PATENT OFFICE.

FELIX LANGE, OF BERLIN LANKWITZ, GERMANY.

METHOD OF ALUMINO-THERMIC PRESSURE WELDING.

Application filed May 28, 1927, Serial No. 195,093, and in Germany September 17, 1926.

The invention relates to a novel method of exothermic pressure welding or butt welding elements, such as railway rails and the like, and has for its object to so apply the products of the exothermic reaction to the parts to be welded under pressure as to insure a substantially uniform heating of the parts to welding temperature.

The usual practice of pressure welding or butt welding elements, such as rails, by the alumino-thermic process is to enclose the ends of the elements to be welded in a mold of suitable form to provide a space completely surrounding the ends of the elements, into which space the superheated product of the alumino-thermic reaction, which has been produced in a separate crucible, is poured to heat the elements to welding temperature, the finished welds being produced by forcing the elements together under pressure. The practice of this method, however, involves a relatively large loss of heat, because the reaction of the alumino-thermic mixture is effected in a separate crucible and the superheated metal must be teemed from the crucible into the mold. An alternative procedure has been suggested, namely, to effect the alumino-thermic reaction in the mold, but this method has proven difficult and even ineffective in many instances, because of the inability to charge a sufficient quantity of the alumino-thermic mixture into the mold, more especially in the lower portions of the mold space, such, for example, as that lying below the bases of railway rails and like elements to be welded. A further objection to this particuar method is that the products of the alumino-thermic reaction, which is carried out inside of the mold, frequently produce excessive local heating of the parts to be welded, which results in the melting or washing away of the parts, more especially the thinner sections and protruding edges, and resultant fusion of the alumino-thermic iron or steel with the metal of the rails or other elements to be welded, thereby unduly increasing the cross sections of the parts and, in some instances, completely deforming the parts, thereby nullifying the main advantage of the butt or pressure weld, as compared with the fusion weld or the combined fusion and pressure weld. According to the present invention, the difficulties and objections inherent in both of the former methods of alumino-thermic pressure welding are obviated and a large economic advantage is gained, first, in the conservation of the heat produced by the alumino-thermic reaction, and second, by the production of an efficient and effective butt or pressure weld between the elements. This result is obtained by enclosing the ends of the elements, such as the rails, in a mold which provides a space surrounding the enclosed ends of the elements, supplying the upper part of the mold cavity with the alumino-thermic mixture, charging the lower part of the cavity with the superheated metal and slag resulting from the alumino-thermic reaction carried out in a separate crucible and tapped into the mold through a pouring gate communicating with the bottom part of the mold, and finally pressing the heated elements together to effect the pressure or butt weld.

A simple means for carrying out the method is illustrated in the accompanying drawing, which is a transverse sectional elevation of a mold enclosing the ends of railway rails to be butt welded.

Referring to the drawing, $a$ represents the cross section of one of the rails, the ends of which rails are enclosed in the mold $b$, which is provided with a space completely surrounding the ends of the rails, the upper portion of the space or cavity being indicated at $d$ and constituting that portion of the space or cavity above the rail base, the lower portion of the space below the base being indicated at $c$, and the upper and lower portions of the space or cavity being connected by relatively narrow channels $e$. Connecting the upper part of the mold with the lower space $c$ of the cavity is a pouring gate $f$.

In carrying out the invention, the portion of the mold cavity or space $d$ is supplied with the requisite quantity of alumino-thermic mixture, which may completely surround and embed the ends of the rails above the bases of the latter. A sufficient quantity of alumino-thermic mixture is then brought to reaction in a suitable crucible and the superheated metal and slag resulting from the reaction is poured into the mold through the gate $f$, enters and fills the space $c$, and a sufficient portion of the superheated product passes by way of the channels $e$ into contact with the alumino-thermic mixture in the mold cavity $d$, thereby igniting the mixture, and causing the same to react, the heat of the reaction being sufficient to bring the ends of the enclosed rails a to a temperature to cause the abutting faces to unite in a substantially uniform butt weld, when longitudinal pressure is applied to the rails to force the abutting faces together.

What I claim is:

1. The method of making pressure welds, which comprises enclosing the elements to be welded in a mold, supplying the upper part of the mold cavity surrounding said elements with an exothermically reactive mixture, charging the lower part of the cavity with liquefied exothermic melt separately prepared, and pressing the heated elements together.

2. The method of making alumino-thermic pressure welds, which comprises enclosing the elements to be welded in a mold, supplying the upper part of the mold cavity surrounding said elements with alumino-thermic mixture, charging the lower part of the cavity with liquefied alumino-thermic melt separately prepared, and pressing the heated elements together.

In testimony whereof I affix my signature.

FELIX LANGE.